United States Patent [19]

Nettles

[11] Patent Number: 5,430,806
[45] Date of Patent: Jul. 4, 1995

[54] SYSTEM FOR CHANGING PERSPECTIVE OF 3-D IMAGES OBTAINED FROM REFLECTED ENERGY SIGNALS

[75] Inventor: James L. Nettles, Arlington, Tex.

[73] Assignee: Loral Vought Systems Corporation, Grand Prairie, Tex.

[21] Appl. No.: 116,907

[22] Filed: Sep. 7, 1993

[51] Int. Cl.⁶ .............................................. G06K 9/00
[52] U.S. Cl. ................................................... 382/295
[58] Field of Search .................... 382/41, 44–47; 358/107; G06K 9/32, 9/36, 9/42; H04N 7/00

[56] References Cited

U.S. PATENT DOCUMENTS

| | | | |
|---|---|---|---|
| 3,562,423 | 2/1971 | Murphy | 382/45 |
| 4,624,013 | 11/1986 | Vrushibata | 382/9 |
| 4,630,306 | 12/1986 | West et al. | 382/21 |
| 4,688,091 | 8/1987 | Kamel et al. | 382/45 |
| 4,688,092 | 8/1987 | Kamel et al. | 382/45 |
| 4,791,676 | 12/1988 | Flickner et al. | 382/26 |
| 4,988,189 | 1/1991 | Kroupa et al. | 382/45 |

OTHER PUBLICATIONS

Neter and Wasserman, "Applied Linear Statistical Models," 1974, pp. 214–215, place of pulbication unknown.

McGraw–Hill Encyclopedia of Science & Technology, (7 ed), 1992, pp. 402–403, place of publication unknown.

Primary Examiner—Jose L. Couso
Attorney, Agent, or Firm—Arnold, White & Durkee

[57] ABSTRACT

A system for transforming a first 3-D image of a target scene obtained from reflected energy signals to create a second 3-D image from a different perspective. In an illustrative embodiment, the original image includes multiple data elements stored in addresses of a row-column array, where each data element comprises a range and an intensity value corresponding to a point in the target scene. Each data element may be addressed by selecting its row and column numbers. To create the new image, each data element's row-column address is first converted into a spherical coordinate. The spherical coordinate is then converted into a 3-D Cartesian coordinate, and the Cartesian coordinate is translated and rotated to achieve the new perspective. The translated, rotated, Cartesian coordinate is then converted back into a spherical coordinate, and then into row-column format. Then, the contents of each data element of the original array are stored in the new array, in the newly calculated address. A "hidden surface" algorithm may be employed to remove images corresponding to surfaces that are blocked or "hidden" when viewed from the new perspective. This is accomplished by filling unused addresses of the new array with range and intensity values calculated to match that of a background plane.

17 Claims, 4 Drawing Sheets

SYSTEM FOR CHANGING PERSPECTIVE OF 3-D IMAGES OBTAINED FROM REFLECTED ENERGY SIGNALS

BACKGROUND OF INVENTION

1. Field of Invention

The present invention relates to an improved system for obtaining data such as range and intensity information from reflected energy signals. More specifically, the invention concerns a system for scanning a target scene with a laser light source, receiving light signals reflected by the target scene, creating a three-dimensional (3-D) image of the target scene using the reflected signals, and re-sampling the 3-D image to effectively change the perspective of the image.

2. Description of Related Art

Many different systems are known for acquiring electrical images representative of visual target scenes such as landscapes, buildings, military targets, and the like. In one example of such systems, a visual image of a target scene is obtained by a satellite. This type of system is an example of a "passive" system, since the visual image is obtained simply by sensing ambient heat or visible light reflected by the target scene, rather than by sensing reflected light generated by man-made energy sources such as lasers, radar, or other "active" energy sources. In an exemplary satellite system, the satellite detects the ambient light reflected from the target scene, and produces an array, where each element of the array represents the intensity of the reflected ambient light emanating from a designated portion of the target scene. In some applications, this array may be depicted on a multiple pixel screen, where the brightness and/or color of a given pixel may signify the intensity of light reflected by a corresponding portion of the target scene. The array is typically stored in computer memory.

Such systems have been utilized widely for quite some time, and many users have found them to be satisfactory for their purposes. However, when considered in other applications, these systems have a number of limitations. First of all, it may be difficult to interpret the data provided by these systems, since a given level of light intensity may indicate a nearby object with low reflectivity, or a distant object with high reflectivity.

As a result, some users employ passive detection systems in conjunction with "contour maps" that contain detailed terrain elevation data for the target scene. By mathematically correlating a contour map with intensity data obtained by a satellite, it is possible to determine the range in addition to the reflectivity of objects in a target scene. However, this approach has some limitations. More specifically, the resolution of many existing contour maps sometimes exceeds 100 feet, even though some applications may require resolution of six inches or less. Although this problem might be mitigated somewhat by using a custom contour map, the process of constructing such a map may be labor intensive, time consuming, and expensive.

As a result, many people have turned to laser detecting and ranging (LADAR) systems, which use light detecting equipment to record light signals that are generated by a laser light source and reflected by one or more objects in the target scene. Typically, a laser light source transmits laser light signals toward the target scene in a pattern such as a raster, star sequence, or circle sequence. Light detecting equipment, which is often co-located with the laser light source, detects light signals that are reflected by the objects and terrain of the scene. "Objects," for the present discussion, may include fixtures, trees, features of the terrain, moveable items, and other things capable of reflecting or absorbing a laser light signal. With LADAR systems, the shape, orientation, position, and other information about a distant object are derived from the intensity of the light reflected by the object. The range of the object (i.e., distance between the object and the light detecting optics) is derived from the time laser light takes to travel to and from the object.

Raw data collected by a LADAR system is typically processed by electronic processing circuitry such as a computer. During testing or development of the processing circuitry and associated algorithms, a substantial amount of data is collected. Each 3-D image generated by a LADAR system provides information about the target scene from the position of the light detecting optics when the data was sampled. The position of the light detecting optics during scanning of a target scene is the "perspective" of the light detecting optics for that image.

Sometimes after a set of data has been collected, it is desirable to have an image of the same scene, from a different perspective. For instance, it may be useful to generate a series of images of a target scene from different perspectives for use as test input data for a computer controlled guidance or tracking system. By feeding such images to the guidance or tracking system, a test engineer may monitor the system's response under simulated conditions.

A conventional approach to the need for multiple images from diverse perspectives has been to simply reposition the LADAR equipment as desired, re-transmit light signals with the laser source, and re-record the reflected light signals with the light detecting optics. Although this approach may be adequate in some applications, it is limited when used in other contexts. For example, re-positioning the LADAR equipment and re-sampling the data may be expensive and time consuming. Additionally, while it may be desirable to have an image from a certain perspective, it may be impossible in some cases to physically locate the detecting equipment at the required location.

In contrast to the conventional approach discussed above, another approach has been to use a synthetic model of a target scene to generate images of the target scene from different perspectives. With this method, computers are used to mathematically construct a detailed three-dimensional graphical model of the target scene. Then, the target scene may be viewed from any desired perspective by providing the computer with the three-dimensional coordinates of the desired perspective. Although this approach may be helpful in a number of respects, it is limited from the standpoint of complexity and realism. In particular, the synthetic model lacks "real life" aspects, such as electrical or optical noise that would inevitably be present in actual data. Consequently, if a series of synthetic images is generated as test input for a guidance or tracking system, the system's response to noise or other interference generally cannot be determined.

BRIEF SUMMARY OF INVENTION

The present invention concerns a system for changing the perspective of a 3-D image that was originally obtained by sampling energy signals reflected from a target scene. In a general aspect, the invention re-samples an original three-dimensional LADAR range image to create a new image from a different perspective. The new image corresponds to that which would have been produced by placing the light detecting optics in a different location relative to the target scene. The original image includes a plurality of data elements, each data element including a range value and an intensity value that correspond to a point in the target scene. When the image is originally obtained, the data is represented according to angles of a spherical coordinate system having an origin at the detecting optics. The spherical coordinate system is convenient to use, since the angles may be measured about the axes of rotation of the detecting optics. The image is converted from the spherical coordinate system to a row-column format for storage in an original row-column array. As in the spherical coordinate system, each data element in the row-column array includes a range value and an intensity value that correspond to a point in the target scene.

An exemplary embodiment of the invention functions to re-sample data of the original row-column array to create a new row-column array from a different perspective. To accomplish this, the row and column addresses of each data element are first converted into angles of a spherical coordinate system having an origin that coincides with the detecting optics. Then, calculations are performed on the data elements' angles and range values to represent the data elements in a Cartesian coordinate system. Next, the Cartesian coordinates are effectively translated and rotated, to achieve the new perspective. Then, the data elements' Cartesian coordinates are converted back into angles and range values of a spherical coordinate system, and then the data elements are finally represented in row-column format. The new representations of the data elements are stored in the new row-column array.

A "hidden surface" algorithm may be employed to remove images corresponding to surfaces visible from the original perspective that are blocked or "hidden" from the new perspective. This is accomplished by filling empty data elements in the new array with range and intensity values calculated to match that of a "background" plane.

DESCRIPTION OF DRAWINGS

The nature, objects, and advantages of the invention will become more apparent to those skilled in the art after considering a more detailed embodiment of the invention in conjunction with the following drawings, in which like reference numerals designate like parts throughout, wherein.

DESCRIPTION OF A PREFERRED EMBODIMENT

Structure

Figure 1:
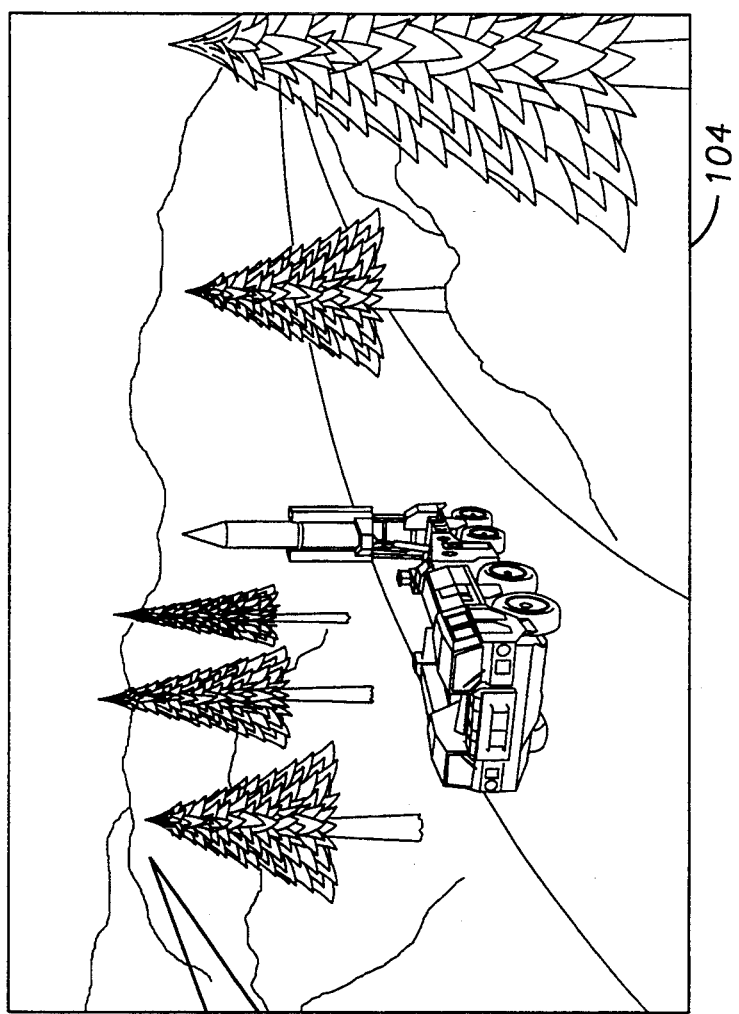
FIG. 1 is an illustration of a LADAR system for scanning a target scene 104 in accordance with the present invention.
Figure 1:
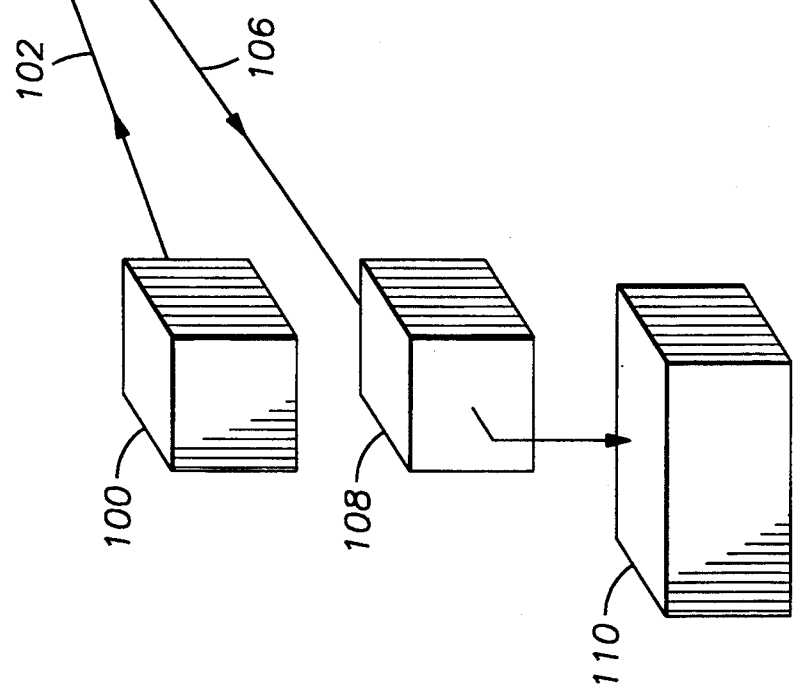

In accordance with a preferred embodiment of the invention (FIG. 1), a light source 100 generates a laser light beam 102, and scans the beam 102 across a target scene 104 in a predetermined pattern. The pattern may comprise a raster, a star sequence, a circular sequence, or another suitable pattern that adequately scans the target scene 104. The beam 102 is reflected in a number of directions by objects of the scene 104; some of the reflections are directed at detecting optics 108. For example, when the beam 102 is in the position shown in FIG. 1, one of the reflections is a beam 106, which is sensed by light detecting optics 108. Although the light source 100 and detecting optics 108 may comprise a number of different known LADAR arrangements, a preferred system is that disclosed in U.S. Pat. No. 5,243,553('553), entitled "Gate Array Pulse Capture Device", issued Sep. 7, 1993 in the name of Stuart Wayne Flockencier. The entire '553 patent is hereby incorporated by reference. The signal produced by the light detecting optics 108 is processed and stored by a processor 110 to arrange the data into row-column format, in accordance with one or more known methods. In accordance with the invention, and as described below, the processed signal may be further processed by the processor 110 of the invention, or alternatively, by an offsite processor (not shown) such as a personal computer, a mini-computer, or other suitable computing device.

Operation

The method of the invention, in an illustrative embodiment, generally operates to receive a 3-D image in row-column format from the processor 110, and to create a new row-column image from a different, desired perspective. The method of the invention may be implemented using a Main Program and a Background Plane Routine. In an exemplary embodiment, these programs may be implemented by a computer program that includes a number of FORTRAN language programming lines, such as those shown in the programs of Appendices A and B. Appendices A and B are hereby incorporated by reference in their entirety. Prior to executing the Main Program and Background Plane Routine of the invention, the laser light source 100 scans the target scene 104, the light detecting optics 108 sense light signals reflected by the target scene 104, and the processor 110 "processes" and stores the detected signals.

Appendices A and B contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This processing generally involves representing the detected signals as data elements in a spherical coordinate system, and then converting the data elements into a row-column format. In particular, the processor 110 initially represents a 3-D LADAR image according to a spherical coordinate system of some type, which has an origin that coincides with the location of the detecting optics 108. This may be performed in accordance with known techniques. The spherical coordinate system is convenient to use since the angular position of a point in the target scene 104 may be measured with respect to axes that coincide with the axes of rotation of the detecting optics 108 during scanning of the target scene 104. Moreover, the spherical coordinate system is conducive to storing the range of a point in the target scene 104, since the point's range corresponds to the radius from the detecting optics 108 to the point. Each data element also includes an intensity value, representative of the intensity of the reflected light.

After representing the detected signals as data elements in the spherical coordinate system, the processor 110 may utilize known methods to more conveniently store the data elements in row-column format, in an original array. As in the spherical coordinate system, each data element in the row-column format includes a range value and an intensity value corresponding to a point in the target scene 104. The range value represents the range between the detecting optics and the point of the target scene 104 represented by the data element. Similarly, the intensity value represents the intensity of the light reflected from the point of the target scene 104 represented by the data element.

Figure 2:
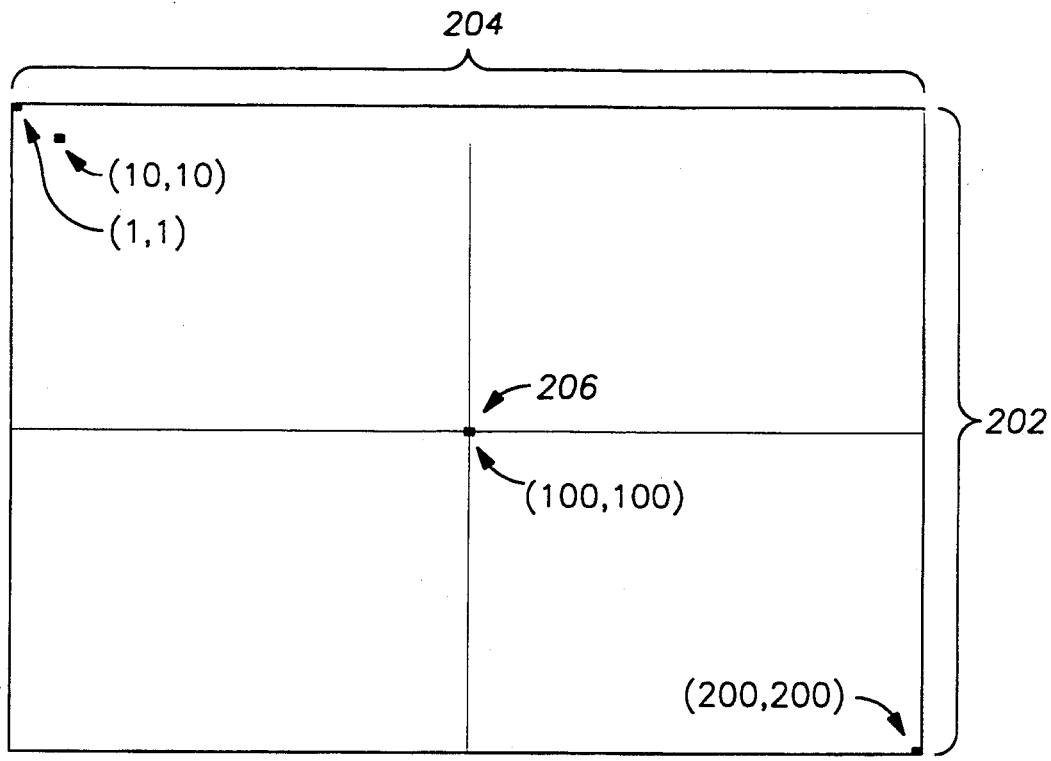
FIG. 2 is a row-column format diagram of a processed image, in accordance with the present invention.

Preferably, the original array comprises an array 200 (FIG. 2) that includes a plurality of data elements arranged in rows 202 and columns 204. In this arrangement, each data element may be addressed by using its row number and its column number. For example, a central data element 206 may be located at an address (row$_{center}$,column$_{center}$). If the array contains 200 rows and 200 columns, the address of (row$_{center}$,column$_{center}$) would be (100,100). Each data element's address (i.e., row and column numbers) corresponds to the specific point of the target scene 104 that is represented by that data element. The row-column format is preferable because of its compatibility with visual displays—the array 200 depicts the objects in the target scene 104 as a viewer would see them, namely from one perspective.

Using the row-column format, the data elements may be conveniently represented on a graphics display, for example, with each data element's color representing range, each data element's brightness representing intensity, and each data element's address representing the location of the data element in the array 200. Since processors capable of storing scanned data in row-column arrays are already known, the steps involved in constructing such an array will not be discussed further.

Figure 3:
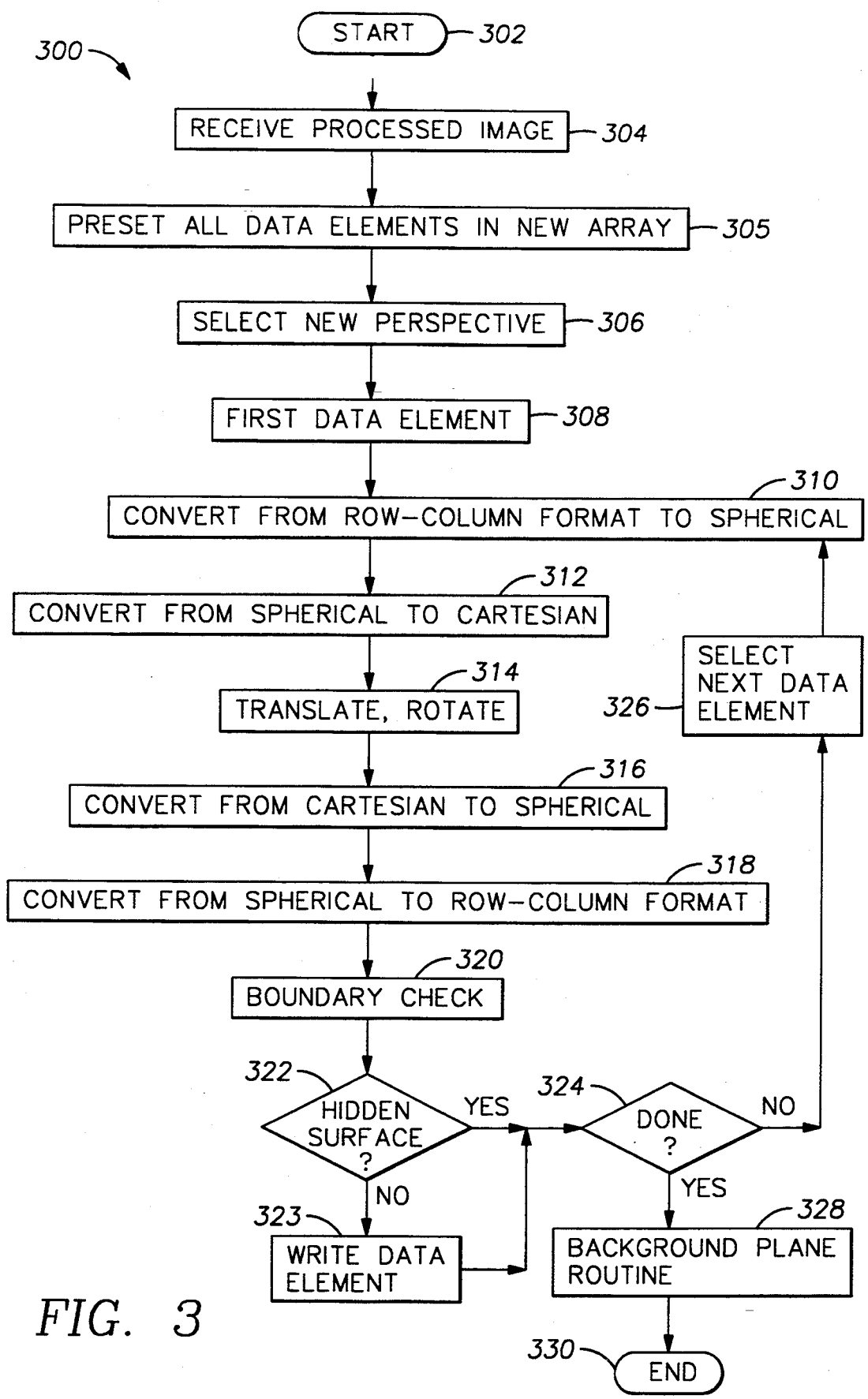
FIG. 3 is a flowchart of a Main Program 300 useful in the practice of the present invention.

After the processor 110 processes and stores the detected signals in the original row-column array, the Main Program (FIG. 3) is initiated. As explained earlier, the Main Program begins the process of generating a new array that views the target scene 104 from a different perspective. The Main Program includes a number of tasks 300, beginning at task 302. In task 304 of the Main Program, the processed image is received from the processor 110 in the form of the original row-column array 200. Task 305 then initializes a new row-column array (not shown).

Ultimately, the new row-column array will contain data elements representative of the target scene 104 viewed from a different perspective than the image of the original row-column array 200. To accomplish this, the tasks 300 perform various calculations to identify the address in the new row-column array where the contents of each data element of the original row-column array 200 should be stored in accordance with the new perspective. To initialize the new row-column array, task 305 sets each data element of the new array equal to a unique "dummy" value. When the contents of the data elements of the original row-column array 200 are stored in the appropriate addresses of the new row-column array, they are substituted for the unique dummy values initially stored there. Therefore, any addresses of the new row-column array that are not filled with the contents of a data element stand out, as containing the unique dummy value. In this way, blank addresses of the new row-column array may be easily identified, for purposes described in greater detail below.

Figure 4:
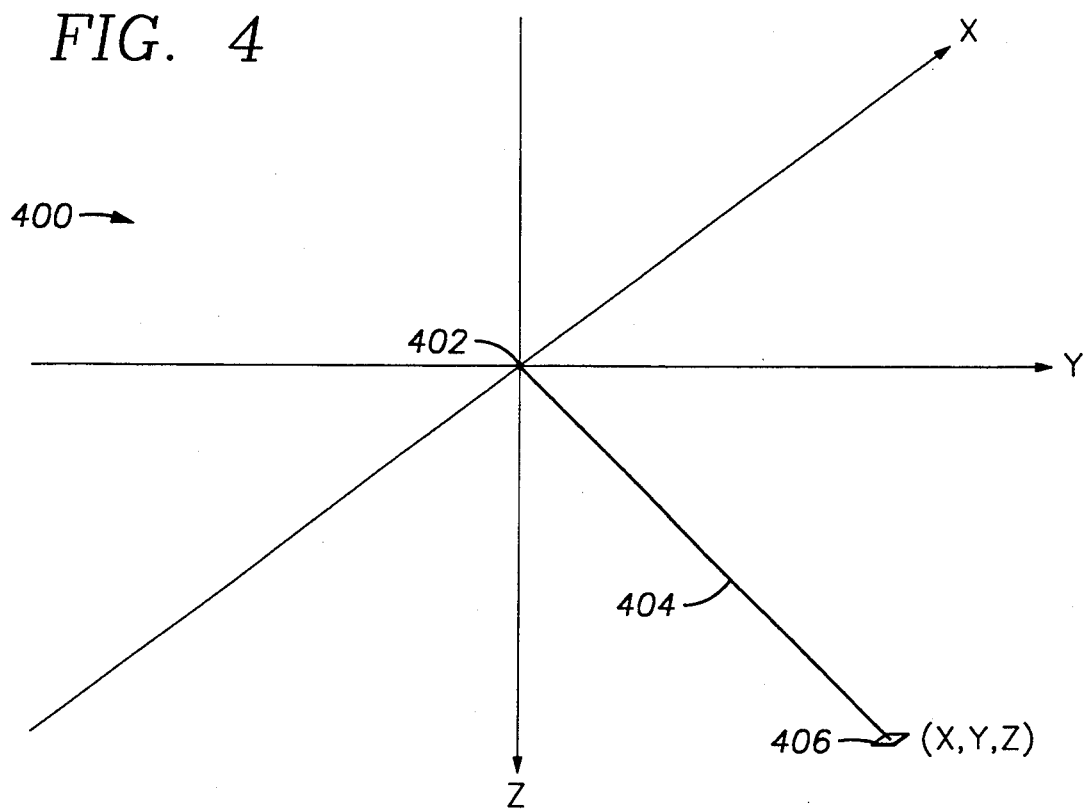
FIG. 4 is a diagram illustrating a coordinate system for quantifying an original or first perspective 402 of the detecting optics 108 in accordance with the invention.

In task 306, the user selects a new perspective for displaying the image of the target scene 104. To quantify the original and new perspectives, the invention uses a coordinate system 400 (FIG. 4), wherein the original perspective 402 of the light detecting optics 108 is (0,0,0), the light detecting optics 108 are oriented toward a focus point 406, and the line of sight of the detecting optics 108 is a line 404. To select a new perspective, the user chooses the coordinates of that perspective in the same three-dimensional system 400 as the original perspective 402. In addition, the user may specify an angle of "roll" about the line of sight between the new perspective and the focus point 406. The angle of roll permits the user to effectively rotate the image, thereby viewing the image, for example, "sideways" or "upside-down."

After task 306, task 308 begins sequentially calculating the new addresses of each data element of the array 200. Task 308 begins with the first data element of the row-column array 200, which may be selected arbitrarily, e.g., the top left corner, center, bottom right corner, etc. Task 310 then transforms the address of the selected data element from the row-column format used in the array 200 to a spherical coordinate system. To accomplish this transformation, an angle $\Phi$ is used to represent the row address of the data element in the row-column array 200, and an angle $\Theta$ is used to represent the column address of the data element in the row-column array 200. The address (row$_{center}$,column$_{center}$) is represented as ($\Phi=0$, $\Theta=0$) in the spherical coordinate system. This transformation may be accomplished, in an illustrative embodiment, using Equations 1 and 2 (below).

$$\Phi = \Delta_\Phi \cdot (\text{row} - \text{row}_{center}) \quad [1]$$

$$\Theta = \Delta_\Theta \cdot (\text{column} - \text{column}_{center}) \quad [2]$$

In Equations 1 and 2, $\Delta_\Phi$ represents the angular spacing between rows, and $\Delta_\Theta$ represents the angular spacing between columns. The values of $\Delta_\Phi$ and $\Delta_\Theta$ are preferably selected so that a given angular measurement $\Phi$ or $\Theta$ corresponds to the same angular measurement with respect to the detecting optics 108. For example, if the light detecting optics 108 contain a lens having vertical and horizontal field angles of 10°, and the size of the row-column array 200 is 200 rows by 200 columns, then $\Delta_\Phi$ and $\Delta_\Theta$ would both be 0.05°. The vertical and horizontal field angles of a typical LADAR lens are typically between 1.5° and 20°. In Equations 1 and 2, row$_{center}$ and column$_{center}$ are subtracted so that the central data element 206 in the spherical coordinate system is set at ($\Phi=0$, $\Theta=0$). The spherical coordinate system of Equations 1-2 may be especially useful when the detecting optics 108 are rotable about two axes.

Having transformed the row-column address of the selected data element into the spherical coordinate system, the program advances to task 312, where the spherical coordinate of the selected data element is converted into a 3-D Cartesian coordinate. The reason for this transformation is that the mathematical operation of expressing the data element's location from the new perspective is more easily accomplished in a 3-D Cartesian coordinate system. In an exemplary embodiment, the conversion of task 312 may be accomplished using Equations 3, 4, and 5 (below).

$$z = R \cdot \cos \Theta \quad [3]$$

$$x = R \cdot \cos \Theta \cdot \sin \Phi \quad [4]$$

$$y = R \cdot \sin \Theta \cdot \sin \Phi \quad [5]$$

In Equations 3–5, the variable "R" is the range between the detecting optics 108 and the point in the target scene 104 represented by the selected data element. The variables x, y, and z are the data element's 3-D Cartesian coordinates from the new perspective.

After task 312, task 314 performs "translation" and "rotation" operations on the selected data element. "Translation" refers to the representation of the original image from a new viewpoint, and "rotation" refers to any rotation (i.e., "roll") of the image about the line of sight between the new perspective and the focus point 406. Task 314 accomplishes this by taking the point of the target scene 104 represented by the selected data element and expressing its location according to a modified 3-D Cartesian coordinate system having the new perspective as its origin.

Figure 5:
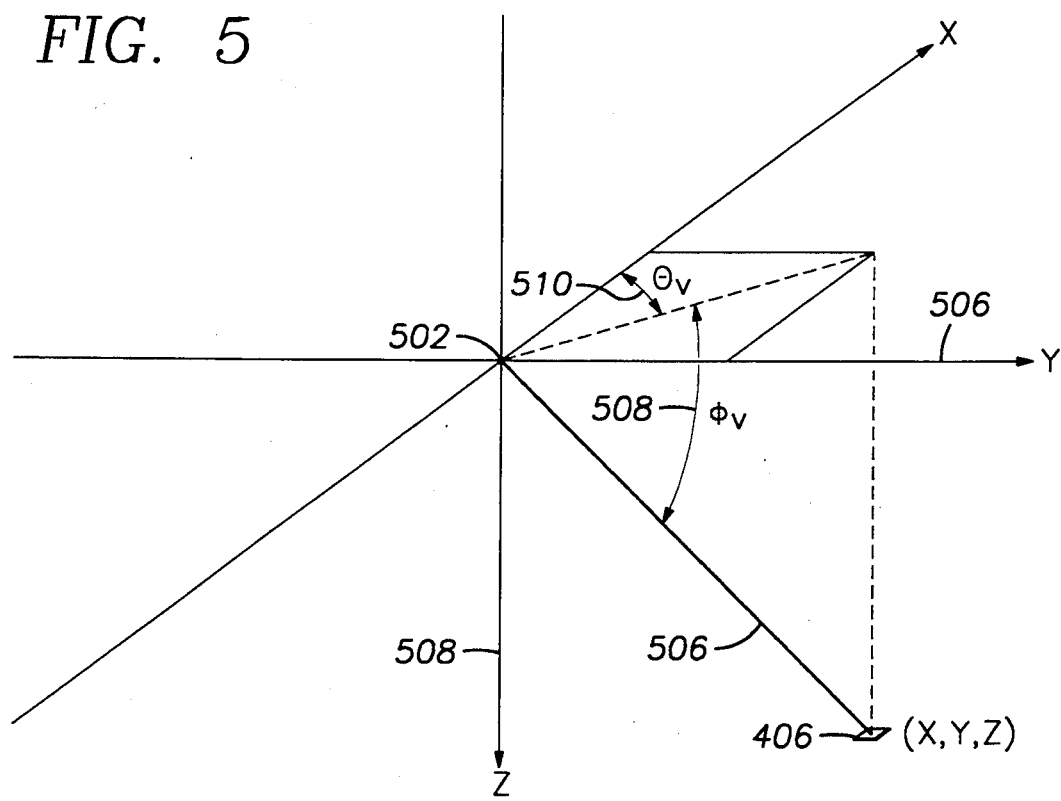
FIG. 5 is a diagram illustrating a coordinate system for quantifying a new or second perspective 502 of the detecting optics 108 in accordance with the invention.

FIG. 5 depicts the new perspective 502, the focus point 406, and the line of sight 506 between the new perspective 502 and the focus point 406. In an exemplary embodiment, the translation and rotation of tasks 314 may be accomplished by multiplying and subtracting certain matrices, as shown in Equation 6 (below).

$$\begin{vmatrix} x' \\ y' \\ z' \end{vmatrix} = \begin{vmatrix} T_{1,1} T_{1,2} T_{1,3} \\ T_{2,1} T_{2,2} T_{2,3} \\ T_{3,1} T_{3,2} T_{3,3} \end{vmatrix} \begin{vmatrix} x \\ y \\ z \end{vmatrix} - \begin{vmatrix} x_0 \\ y_0 \\ z_0 \end{vmatrix} \quad [6]$$

Equation 6 yields the new 3-D Cartesian coordinates (x',y',z') of the selected data element. As shown in Equation 6, these coordinates are obtained by multiplying the original 3-D Cartesian coordinates (x,y,z) of the data element by a transformation matrix (T), and subtracting the 3-D Cartesian coordinates $(x_o, y_o, z_o)$ of the new perspective. In an illustrative embodiment, the transformation matrix T comprises the elements of Equation 7-15 (below).

$$T_{1,1} = \cos \Theta_y \cos \Psi_y \quad [7]$$

$$T_{1,2} = \cos \Theta_y \sin \Psi_y \quad [8]$$

$$T_{1,3} = -\sin \Theta_y \quad [9]$$

$$T_{2,1} = \sin \Phi_y \sin \Theta_y \cos \Psi_y \sin \Psi_y \quad [10]$$

$$T_{2,2} = \cos \Psi_y \cos \Psi_y + \sin \Theta_y \sin \Psi_y \quad [11]$$

$$T_{2,3} = \sin \Phi_y \sin \Theta_y \quad [12]$$

$$T_{3,1} = \sin \Phi_y \sin \Psi_y + \cos \Phi_y \sin \Theta_y \cos \Psi_y \quad [13]$$

$$T_{3,2} = \cos \Psi_y \sin \Theta_y \sin \Psi_y - \sin \Phi_y \cos \Psi_y \quad [14]$$

$$T_{3,3} = \cos \Theta_y \cos \Psi_y \quad [15]$$

In Equations 7–15, $\Theta_y$ is a "pitch" angle 508 of the line of sight 506, i.e., the angle the line of sight 506 makes with the x-z plane. Likewise, $\Psi_y$ is a "yaw" angle 506 of the line of sight 506, i.e., the angle the line of sight 506 makes with the x-y plane. Furthermore, $\Phi_y$ is the "roll" angle, if any, of the new perspective about the line of sight 506. In other words, $\Phi_y$ represents any amount that the image of the target scene 104 might be rotated about the focus point 406.

Having represented the location of the selected data element in relation to the new perspective 502, the data element's 3-D Cartesian coordinate is converted to a spherical coordinate in task 316. The reason for this step is that transformation back into the spherical coordinate system, and then the row-column format, prepares the array for viewing, for example, on a graphics monitor. For the transformation of task 316, Equations 16–18 (below) are used.

$$R' = [(x')^2 + (y')^2 + (z')^2]^{\frac{1}{2}} \quad [16]$$

$$\Theta' = \tan^{-1}(y'/x') \quad [17]$$

$$\Phi' = \tan^{-1}(z'/(x'^2)) \quad [18]$$

In Equations 16–18, R' is the new range of the selected data element, $\Theta'$ is the horizontal angle of the date element, and $\Phi$ is the new vertical angle of the data element. The coordinate (x',y',z') is the new Cartesian coordinate of the selected data element. After task 316, task 318 converts the address of the data element from the spherical coordinate system into the row-column format, using Equations 19 and 20 (below).

$$\text{row}' = \Phi'/\Delta'\Theta + \text{row}_{center} \quad [19]$$

$$\text{column}' = \Theta'/\Delta'\Theta + \text{column}_{center} \quad [20]$$

In Equations 19–20, the data element's new address in the row-column format is (row', column').

Task 320 then performs a "boundary check." In particular, if the new row and/or column address (row', column') of the selected data element is larger than the limits of the array 200, the selected data element simply will not fit in the new array. In this event, task 320 ensures that the selected data element is not stored in the new array. This situation may arise, for example, if the new prospective 502 is substantially closed to the target 406 than the original perspective. By "zooming-in" on a certain area, that area is magnified, and as a result, the new array may not be able to store some of the surrounding data elements. Alternatively, the new-column array may be larger than the array 200 to help avoid this situation.

After task 320, query 322 performs a "hidden surface check." Since the perspective of the image has changed, some surfaces originally depicted in the array 200 may be blocked from view in the new array, due to the new positions of certain other surfaces. Therefore, task 322 is performed before storing the range value (R) of the selected data element in the new array at the new address (row', column'). Task 322 determines whether a smaller range value has already been stored at that address in the new array. If so, this indicates a representation of a surface that is nearer to the detecting optics 108 than the surface corresponding to the selected data element. In this case, data corresponding to selected data element should not be stored in the new array; this data element is therefore effectively "hidden" by going directly to task 324.

However, if the point in the target scene 104 represented by the selected data element is not "hidden," task 323 writes the new range (R', calculated in task 318) to the appropriate address (row', column')in the new array. In task 323, the original intensity value of the data element is also stored in the new array, at the new address (row', column'). Query 324 then asks whether all data elements of the original array 200 have been processed by the steps 310-323. If not, task 326 selects another next data element to be processed, and returns to task 310.

However, if task 324 determines that all data elements of the original array 200 have been processed, control advances to task 328, and the Background Plane Routine is performed. Generally, the Background Plane Routine searches the new array for addresses that do not contain any data, and fills in these addresses with a range value corresponding to the "background surface." In many applications, the background surface may be the earth's surface, or the surface of a body of water. After task 328, the Main Program ends in task 330.

Figure 6:
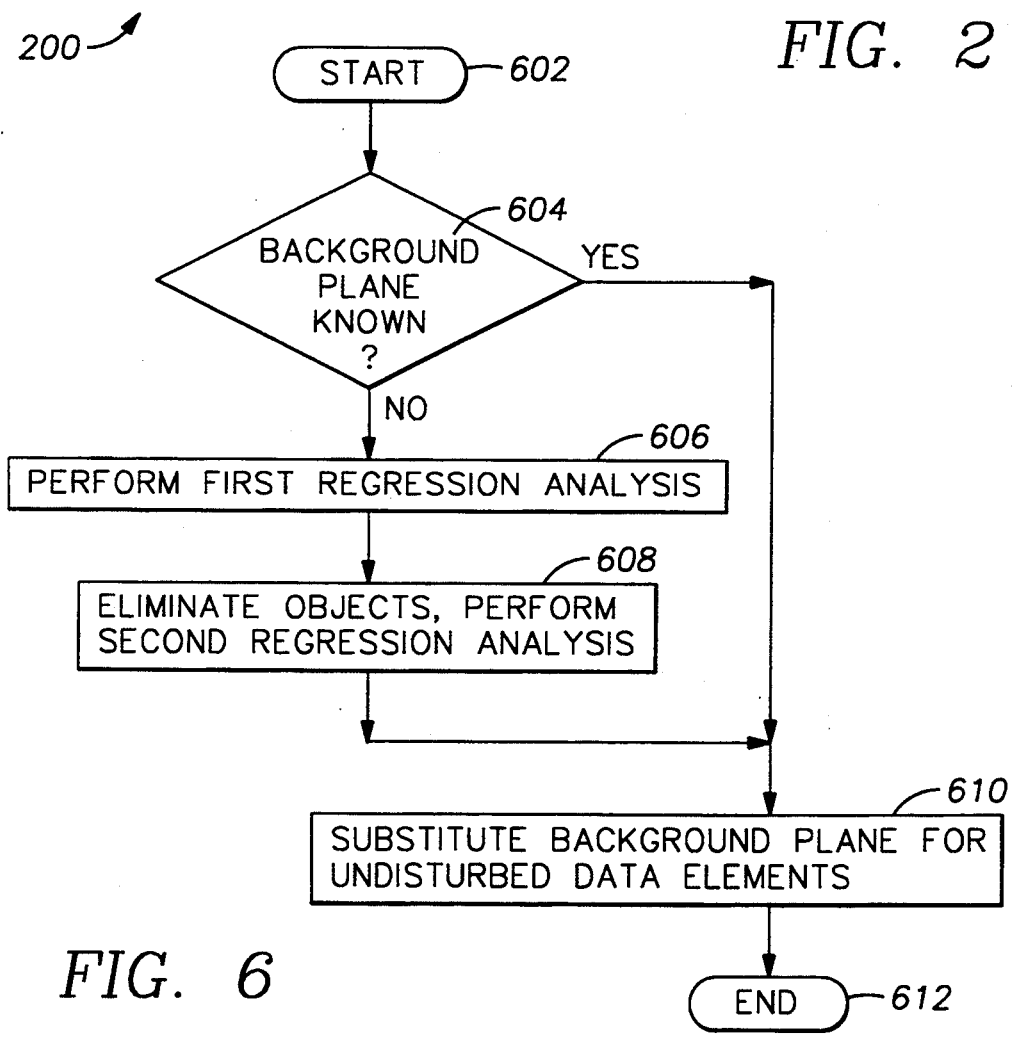
FIG. 6 is a flowchart of a Background Plane Routine useful in the practice of the invention.

The Background Plane Routine (FIG. 6) includes a number of tasks 600, which are initiated in task 602. Query 604 asks whether the orientation of the background plane with respect to the original perspective 402 is known. If not, tasks 606 and 608 perform two regression analyses to arrive at a plane that approximates the orientation of the "background surface." In task 606, the first regression analysis is performed by utilizing the range values of the original array 200 in a regression formula. An illustrative formula is described in Neter Wasserman, "Applied Linear Statistical Models," (1974), pp. 214-215. The Wasserman reference is hereby incorporated by reference, in its entirety.

The result of task 606 is a first background plane, which approximately represents the background surface. However, due to the presence of trees, buildings, vehicles, or other objects in the target scene 104 that are closer to the detecting optics 108 than the background surface, the background plane of task 606 may contain some error. In particular, this approximation of the background surface may be too near to the detecting optics, i.e., elevated from the true background surface. Therefore, to obtain a more accurate approximation, another regression analysis is performed in task 608. However, in performing the analysis of task 608, all data elements with a range value less than the first background plane are not input into the regression formula. Thus, the regression analysis of task 608 is more accurate, since objects that are effectively "nearer" to the detecting optics 108 than the first background plane are not utilized in the second approximation of the background surface.

After tasks 606 and 608 approximate the background surface, task 610 sequentially advances through all data elements of the new array, searching for data elements that contain the unique "dummy" value stored in task 305. Since the data elements in these addresses were never modified, these data elements contain no data of interest. Assuming that these data elements correspond to the background surface, task 610 fills the address of each unmodified data element with the range of the second background plane corresponding to the portion of the target scene 104 represented by that data element. Alternatively, another value may be written in task 610, if desired. In some applications, for example, a predetermined plane of a selected orientation may be used to achieve another effect.

The present invention provides its users with a number of advantages. For example, the invention provides range and intensity data corresponding to points of a target scene 104, thereby providing more useful data, and reducing the need for complicated contour maps. Further, the invention provides improved resolution compared to passive systems, since it utilizes an active light source.

The invention also provides re-sampled graphical images from user-selected perspectives, reducing the need to reposition LADAR equipment to obtain additional data. Additionally, with the present system, it is possible to obtain graphical data from a theoretical perspective that might be impossible to achieve in practice.

A further benefit of the present invention is that it facilitates improved testing of target recognition equipment. By generating a sequence of images from various perspectives along a path or trajectory, it is possible to simulate the images that would be observed by a missile or airplane in flight. These images may be input to target recognition equipment for testing. The invention therefore avoids the need to acquire multiple images in a field test, and facilitates much more accurate testing in the laboratory.

In addition, the invention provides more realistic results than those derived from synthetic models. Specifically, the invention provides data that inherently contains any noise or interference that may be present in an original LADAR image and, thereby provides more realistic data for testing guidance tracking systems.

While there have been shown what are presently considered to be preferred embodiments of the invention, it will be apparent to those skilled in the art that various changes and modifications may be made herein without departing from the scope of the invention as defined by the appended claims. In particular, the mathematical coordinate systems utilized in conjunction with Equations 1-5 may be modified depending on the geometry of the detecting optics 108 used. For example, a different spherical coordinate system may be used to be compatible with the angular movement of the detecting optics 108.

In addition, a system that avoids the use of arrays in row-column format is contemplated. Specifically, in LADAR systems that provide raw data in the form of ranges and angles, the data may be received and processed in accordance with the invention without the need for the row-column arrays.

APPENDIX A

```c
/*******************************************************************/
/*                                                                 */
/*                        QUICKHIT                                 */
/*                                                                 */
/* Program to transform LADAR data to a different point-of-view    */
/* The 3-D position of the target is determined for each pixel.    */
/* The projection to a new point-of-view determines a pixel-by pixel */
/* mapping of the LADAR intensity to the recon PHOTO coordinates.  */
/*                                                                 */
/* By: B. Pettitt     April 22, 1992 - June 10, 1992               */
/* and D. McArthur    April 22, 1992                               */
/*                                                                 */
/* LTV Aerospace & Defense                                         */
/*******************************************************************/
#include <stdio.h>
#include <math.h>
#include <stdlib.h>
include <time.h> include "qh.def"   /* <-- function prototypes */

/* Macros and constants */
#define EDGE_COLOR   255
#define ARTIF_COLOR  255
#define GET_ANSWER   c = getch();answer[0] = c;if (answer[0] != 'n' && answer[0] != 'N')
#define GET_FILENAME printf("Enter filename: ");scanf ("%s", filename );
#define INTEGER 2
#define BYTE    1

/*******************************************************************/
/******************** START: MAIN() ********************************/
/*******************************************************************/
void main( )
{ int    i, j, k, del;
  int    **edge, **i_edge, **r_edge, **edgecomb, **lines;
  int    **ithin_edge, **rthin_edge;
  int    **recon_edge, **art_regions, **thin_edges, **inten_new_sub;
  int    ncols_ladar, nrows_ladar, ncols_recon, nrows_recon;
  int    **inten_new, **inten_croshair, **z_buf, **recon, **inten_new_edge;
  int    **inten, **range;
  int    **ladar_label_y, **ladar_label_x, edgecount;
  int    replength, intthresh, rngthresh;
  int    c, imag, div, res;
  int    slide,start1col,start1row,start2col,start2row;
  int    ladar_x, ladar_y, recon_x, recon_y;
  int    size;
  char   answer[1], filename[80];
  float  overscan, **re_mat, **se_mat, **pr_mat, deg_to_radian;
  float  pos_sen[3], rr[3];
  float  yaw_sen, yaw_recon,pitch_sen,pitch_recon,roll_sen,roll_recon;
  float  fov_sen, fov_recon, k_col, k_row, kk_col, kk_row;
  char   fln_int[80], fln_rng[80], fln_recon[80];
  FILE   *parms_fp;

/* read in parameter data file */
  if ((parms_fp = fopen("parms.dat", "r")) == NULL)
  { printf("\nError opening parameter data file: parms.dat\n");
    exit(1);
  }
  fscanf(parms_fp,"%f %*s %f %*s %f %*s %f %*s %f %*s %f %*s",
     &yaw_sen, &pitch_sen, &roll_sen, &yaw_recon, &pitch_recon,&roll_recon );
  fscanf(parms_fp,"%f %*s %f %*s %f %*s %d %*s %d %*s %d %*s %d %*s",
     &pos_sen[0], &pos_sen[1], &pos_sen[2],
     &ncols_ladar, &nrows_ladar, &ncols_recon, &nrows_recon );
  fscanf(parms_fp,"%f %*s %d %*s %d %*s %d %*s %d %*s %d %*s %s
                  %*s %s %*s %s",
              &overscan, &replength, &intthresh, &rngthresh,
              &recon_x, &recon_y,fln_int, fln_rng, fln_recon );
  fclose (parms_fp);

/****** initialize constants ******/
  deg_to_radian = 3.1415926/180.0;
  k_row = k_col = 3.5 * 3.14159 /(180.0*nrows_ladar); /* SENSOR pix fov */
  kk_col = kk_row = 1.0/(0.7*k_row);                  /* 1/(RECON pix fov) */

/****** dynamic memory allocation ******/
  re_mat       = (float **) memory(3,3,4);
  se_mat       = (float **) memory(3,3,4);
  pr_mat       = (float **) memory(3,3,4);
```

```
inten            =  (int **) memory(ncols_ladar,nrows_ladar,4);
range            =  (int **) memory(ncols_ladar,nrows_ladar,4);
i_edge           =  (int **) memory(ncols_ladar,nrows_ladar,4);
r_edge           =  (int **) memory(ncols_ladar,nrows_ladar,4);
ithin_edge       =  (int **) memory(ncols_ladar,nrows_ladar,4);
rthin_edge       =  (int **) memory(ncols_ladar,nrows_ladar,4);
thin_edges       =  (int **) memory(ncols_ladar,nrows_ladar,4);
lines            =  (int **) memory(ncols_ladar,nrows_ladar,4);

inten_new_sub    =  (int **) memory(ncols_recon/2,nrows_recon/2,4);

edge             =  (int **) memory(ncols_recon,nrows_recon,4);
recon            =  (int **) memory(ncols_recon,nrows_recon,4);
inten_new        =  (int **) memory(ncols_recon,nrows_recon,4);
inten_new_edge   =  (int **) memory(ncols_recon,nrows_recon,4);
edgecomb         =  (int **) memory(ncols_recon,nrows_recon,4);
recon_edge       =  (int **) memory(ncols_recon,nrows_recon,4);
art_regions      =  (int **) memory(ncols_recon,nrows_recon,4);
z_buf            =  (int **) memory(ncols_recon,nrows_recon,4);
ladar_label_y    =  (int **) memory(ncols_recon,nrows_recon,4);
ladar_label_x    =  (int **) memory(ncols_recon,nrows_recon,4);

/***** initialize matricees to a constant *****/
_Matrix_Init(ncols_ladar,nrows_ladar,    0,inten);
_Matrix_Init(ncols_ladar,nrows_ladar,    0,range);
_Matrix_Init(ncols_ladar,nrows_ladar,    0,i_edge);
_Matrix_Init(ncols_ladar,nrows_ladar,    0,r_edge);
_Matrix_Init(ncols_ladar,nrows_ladar,    0,ithin_edge);
_Matrix_Init(ncols_ladar,nrows_ladar,    0,rthin_edge);
_Matrix_Init(ncols_ladar,nrows_ladar,    0,thin_edges);
_Matrix_Init(ncols_ladar,nrows_ladar,    0,lines);

_Matrix_Init(ncols_recon/2,nrows_recon/2,0,inten_new_sub);

_Matrix_Init(ncols_recon,nrows_recon,    0,edge);
_Matrix_Init(ncols_recon,nrows_recon,    0,recon);
_Matrix_Init(ncols_recon,nrows_recon,    0,inten_new);
_Matrix_Init(ncols_recon,nrows_recon,    0,inten_new_edge);
_Matrix_Init(ncols_recon,nrows_recon,    0,edgecomb);
_Matrix_Init(ncols_recon,nrows_recon,    0,recon_edge);
_Matrix_Init(ncols_recon,nrows_recon,    0,art_regions);
_Matrix_Init(ncols_recon,nrows_recon,70000,z_buf);
_Matrix_Init(ncols_recon,nrows_recon, nrows_ladar/2, ladar_label_y);
_Matrix_Init(ncols_recon,nrows_recon, ncols_ladar/2, ladar_label_x);

/**** SENSOR position and orientation paramerers ******/
yaw_sen     = yaw_sen     * deg_to_radian;
pitch_sen   = pitch_sen   * deg_to_radian;
roll_sen    = roll_sen    * deg_to_radian;
yaw_recon   = yaw_recon   * deg_to_radian;
pitch_recon = pitch_recon * deg_to_radian;
roll_recon  = roll_recon  * deg_to_radian;

/***** generate SENSOR and RECON rotation matrices *****/
r_rot(yaw_recon, pitch_recon, roll_recon, re_mat);
r_rot(yaw_sen, pitch_sen, roll_sen, se_mat);
Mult_Tran_Matrix_3x3(re_mat, se_mat, pr_mat);
Mult_Tran_Matrix_3x1(re_mat, pos_sen, rr);

/***** read intensity and range LADAR images *****/
read_image(fln_int, ncols_ladar, nrows_ladar, inten, 1);
read_image(fln_rng, ncols_ladar, nrows_ladar, range, 2);
eliminate_water(inten, range, ncols_ladar, nrows_ladar);

/***** read original recon photo image       *****/
read_image(fln_recon, ncols_recon, nrows_recon, recon, 1);

printf("Display MISSLE VIEW INTENSITY and RANGE Images? (y/n)\n");
GET_ANSWER
{  disp_2images(ncols_ladar,nrows_ladar,inten,150,50,ncols_ladar,
              nrows_ladar,range,150,250,slide=0);
   write_image(inten, ncols_ladar, nrows_ladar,
              size=INTEGER, "bunint.img");
   write_image(range, ncols_ladar, nrows_ladar,
              size=INTEGER, "bunrng.img");
}

/*****************************************************************/
```

```
/***** determine array size needed for mapping *****/
map_corners(ncols_ladar, nrows_ladar, ncols_recon, nrows_recon,
            pr_mat, rr, k_col, k_row, kk_col, kk_row, range);

/***** map ladar intensity to recce viewpoint *****/
map_visible(overscan, ncols_ladar, nrows_ladar, ncols_recon, nrows_recon,
            pr_mat, rr, k_col, k_row, kk_col, kk_row,
            inten, inten_new, range, z_buf, ladar_label_y, ladar_label_x );

printf("MEDIAN FILTER generated recon? (y/n)\n");
GET_ANSWER
    median(inten_new, ncols_recon, nrows_recon);

printf("Display ORIGINAL LADAR INTENSITY and GENERATED RECON? (y/n)\n");
GET_ANSWER
{   disp_2images(ncols_ladar,nrows_ladar, inten, 1, 160,
                 ncols_recon, nrows_recon, inten_new, 342, 1, slide=0);
    write_image(recon, ncols_recon, nrows_recon,
                size=INTEGER, "labrecc.img");
    write_image(inten_new, ncols_recon, nrows_recon,
                size=INTEGER, "gbunrecc.img");
}
printf("GAP FILL generated recon? (y/n)\n");
GET_ANSWER
{   gapfill(inten_new, ncols_recon, nrows_recon);
    disp_2images(ncols_ladar,nrows_ladar, inten, 1, 160, ncols_recon,
                 nrows_recon, inten_new, 342, 1, slide=0);
    write_image(inten_new, ncols_recon, nrows_recon,
                size=INTEGER, "gbunrecc.img");
}

/*****************************************************************/
printf("Generate ARTIFICIAL REGIONS? (y/n)\n");
GET_ANSWER
{
    /**** find EDGES from LADAR imagery -- generate binary image ***/
    edggrad3(inten, i_edge, ncols_ladar, nrows_ladar, 2, 1, intthresh);
    edggrad3(range, r_edge, ncols_ladar, nrows_ladar, 2, 1, rngthresh);

printf("Display LADAR INTENSITY and EDGE Images? (y/n)\n");
    GET_ANSWER
        disp_2images(ncols_ladar, nrows_ladar, inten, 1,160,ncols_ladar,
                     nrows_ladar, i_edge, 342,160,slide=0);

printf("Display LADAR RANGE and EDGE Images? (y/n)\n");
    GET_ANSWER
        disp_2images(ncols_ladar, nrows_ladar, range, 1,160,ncols_ladar,
                     nrows_ladar, r_edge, 342,160,0);

edge_thin(i_edge, ncols_ladar, nrows_ladar, ithin_edge );
    edge_thin(r_edge, ncols_ladar, nrows_ladar, rthin_edge );

printf("Display INTENSITY and THINNED INTENSITY Images? (y/n)\n");
    GET_ANSWER
        disp_2images(ncols_ladar, nrows_ladar, i_edge, ncols_ladar,
                     nrows_ladar, ithin_edge, 0);

printf("Display RANGE and THINNED RANGE Images? (y/n)\n");
    GET_ANSWER
        disp_2images(ncols_ladar, nrows_ladar, r_edge, ncols_ladar,
                     nrows_ladar, rthin_edge, 0);

/* combine edges from LADAR intensity and range */
    image_OR(ithin_edge, rthin_edge, ncols_ladar, nrows_ladar, thin_edges);

printf("Display COMBINED Edge Image (y/n)\n");
    GET_ANSWER
        disp_2images(ncols_ladar, nrows_ladar, inten, ncols_ladar,
                     nrows_ladar, thin_edges, 0);

find_lines( thin_edges, ncols_ladar, nrows_ladar, lines );

printf("Display LINES Image (y/n)\n");
    GET_ANSWER
        disp_lines( lines, ncols_ladar, nrows_ladar );

/* define artificial (hidden) regions using */
    /* adjacent vertical edge points            */
    map_artificial_V(ncols_ladar, nrows_ladar, ncols_recon, nrows_recon,
                     pr_mat, rr, k_col, k_row, kk_col, kk_row,
                     art_regions, range, z_buf, thin_edges, replength );
```

```
/* define artificial (hidden) regions using */
/* adjacent horizontal edge points          */
   map_artificial_H(ncols_ladar, nrows_ladar, ncols_recon, nrows_recon,
                    pr_mat, rr, k_col, k_row, kk_col, kk_row,
                    art_regions, range, z_buf, thin_edges, replength );

printf("Median filter ARTIFICIAL REGIONS? (y/n)\n");
   GET_ANSWER
   median(art_regions, ncols_recon, nrows_recon);

/* combine edges from LADAR intensity and range */
   image_OR(ithin_edge, rthin_edge, ncols_ladar, nrows_ladar, thin_edges);

free(ithin_edge);
   free(rthin_edge);

printf("Display COMBINED EDGE and ARTIFICIAL REGION Image? (y/n)\n");
   GET_ANSWER
       disp_2images(ncols_ladar,nrows_ladar, thin_edges, ncols_recon,
                    nrows_recon, art_regions,slide=0);

printf("Display ORIGINAL RECON and GENERATED RECON w/ ARTIFICIAL
           REGIONS? (y/n)\n");
   GET_ANSWER
   { Image_OR(art_regions, inten_new, ncols_recon, nrows_recon,
              edgecomb );
       disp_2images(ncols_recon,nrows_recon, recon, 1,160,
                    ncols_recon,nrows_recon, edgecomb, 345, 160, slide=0);
       write_image(edgecomb, ncols_recon, nrows_recon,
                   size=INTEGER, "bunart.img");
   }
} /***** end map artificial block *****/
/**************************************************************/ printf("Display ORIGINAL RECON and GENERATED RECON w/o
        ARTIFICIAL REGIONS? (y/n)\n");
GET_ANSWER
{ disp_2images(ncols_recon,nrows_recon, recon, 1,110,
              ncols_recon,nrows_recon, inten_new, 305,1,slide=0);
  write_image(recon, ncols_recon, nrows_recon,
              size=INTEGER, "labrecc.img");
  write_image(inten_new, ncols_recon, nrows_recon,
              size=INTEGER, "gbunrecc.img");
} printf("Generate EDGES for ORIGINAL RECON image? (y/n)\n");
GET_ANSWER
{
   edggrad3(recon, recon_edge, ncols_recon, nrows_recon,
            1, 1, intthresh/2);
   edggrad3(inten_new, inten_new_edge, ncols_recon, nrows_recon,
            1, 1, intthresh/2);
   edge_thin(recon_edge, ncols_recon, nrows_recon, recon_edge );
   edge_thin(inten_new_edge, ncols_recon, nrows_recon, inten_new_edge );
   disp_2images(ncols_recon, nrows_recon, recon_edge, 1,110,
                ncols_recon, nrows_recon, inten_new_edge, 305, 1,slide=0);
   write_image(recon_edge, ncols_recon, nrows_recon,
               size=INTEGER, "labredge.img");
   write_image(inten_new_edge, ncols_recon, nrows_recon,
               size=INTEGER, "labiedge.img");

printf("Display EDGE OVERLAY and EDGE MATCH image? (y/n)\n");
   GET_ANSWER
   { _Matrix_Init(ncols_recon,nrows_recon,0,edge);
     _Matrix_Init(ncols_recon,nrows_recon,0,edgecomb);
     Image_OR(recon_edge, inten_new_edge, ncols_recon, nrows_recon, edge);
     image_AND(recon_edge, inten_new_edge, ncols_recon,
               nrows_recon, edgecomb);
     disp_2images(ncols_recon,nrows_recon,edge, 1,110,
                  ncols_recon, nrows_recon, edgecomb, 305, 1, slide=0);
     write_image(edge, ncols_recon, nrows_recon,
                 size=INTEGER, "edgecomb.img");
     write_image(edgecomb, ncols_recon, nrows_recon,
                 size=INTEGER, "labmatch.img");
   }
} printf("Display Crosshairs? (y/n)\n");
GET_ANSWER
{ display_crosshairs(ncols_ladar,nrows_ladar, inten, ncols_recon,
```

```
                    nrows_recon, inten_new, slide=2,ladar_label_y,
                    ladar_label_x,recon_y,recon_x);

answer[0]='y';
    while (answer[0]!='n' && answer[0]!='N')
    { printf("Enter new RECON HIT POINT? (y/n)\n");
      GET_ANSWER
        { printf("Old Hitpoint at X,Y = %d,%d\n",recon_x,recon_y);
          printf("Enter new X,Y hitpoint in %dx%d recon
                  photo:\n",nrows_recon,ncols_recon);
          scanf("%d,%d",&recon_x,&recon_y);

display_crosshairs(ncols_ladar, nrows_ladar, inten, ncols_recon, nrows_recon,
                    inten_new, slide=2, ladar_label_y,ladar_label_x,
                    recon_y,recon_x);
        }
    }
  } free(re_mat);
  free(se_mat);
  free(pr_mat);
  free(inten);
  free(range);

free(recon);

free(inten_new);
  free(edge);

free(inten_croshair);
  free(edgecomb);
  free(recon_edge);
  free(art_regions);
  free(z_buf);
  free(ladar_label_y);
  free(ladar_label_x);

printf("\nProgram successfully completed.\n");

} /******************** END: MAIN() ****************************/
/******************************************************************/
/******************************************************************/
/************* START: Subroutine MAP_VISIBLE() ****************/
/******************************************************************/
void map_visible(float overscan,int ncols_ladar, int nrows_ladar,
        int ncols_recon,int nrows_recon,
        float **pr_mat, float *rr,
        float k_col, float k_row, float kk_col, float kk_row,
        int **inten, int **inten_new, int **range, int **z_buf,
        int **ladar_label_y, int **ladar_label_x )
{ int i,j ,ir,jr,ir_cen,jr_cen,oldi ;
  float fli, flj, rt[3], rcol[3], rc[3], jpix, mtk[3], rng ;
  printf("Please wait...mapping VISIBLE regions...\n");
  ir_cen = ncols_recon/2;
  jr_cen = nrows_recon/2;
  /**** For each pixel, ---in small angle approximation ****/
  /**** compute line-of-sight vector in LADAR coordinates ****/
  for (fli=0; fli<ncols_ladar; fli=fli+overscan)
  { i = (int) fli;
    rt[1] = (fli-ncols_ladar/2) * k_col;
    /** transform line-of-sight to recon photo coords **/
    rcol[0] = pr_mat[0][1] * rt[1] + pr_mat[0][2];
    rcol[1] = pr_mat[1][1] * rt[1] + pr_mat[1][2];
    rcol[2] = pr_mat[2][1] * rt[1] + pr_mat[2][2];
    jpix =(float)nrows_ladar/2;
    mtk[0] = pr_mat[0][0]*k_row;
    mtk[1] = pr_mat[1][0]*k_row;
    mtk[2] = pr_mat[2][0]*k_row;
    for(flj=0; flj<nrows_ladar; flj=flj+overscan)
    { j = (int)flj;
      rng = 20 + range[i][j];
      rt[0] = (flj-jpix);
      rc[0] = rr[0] + rng *( mtk[0]*rt[0] + rcol[0] );
      rc[1] = rr[1] + rng *( mtk[1]*rt[0] + rcol[1] );
      rc[2] = rr[2] + rng *( mtk[2]*rt[0] + rcol[2] );
      /** project onto recon plane **/
      if (rc[2]>0.0)
      { ir = ir_cen + kk_col * rc[1]/rc[2];
        jr = jr_cen + kk_row * rc[0]/rc[2];
        if   ( (0<ir) && (ir<ncols_recon) )       /*clip*/
```

```
          { if ( (0<jr) && (jr<nrows_recon) )
            { if ( rc[2] < z_buf[ir][jr] )
              { inten_new[ir][jr] = inten[i][j];
                z_buf[ir][jr] = rc[2];
                ladar_label_y[ir][jr] = i;
                ladar_label_x[ir][jr] = j;
              }
            }
          }
        }
      }
    }
    return;
} /*********** END: subroutine MAP_VISIBLE()****************/
/*******************************************************/
/************  START: Subroutine MAP_CORNERS() *****************/
/*******************************************************/
void map_corners(int ncols_ladar, int nrows_ladar,
        int ncols_recon, int nrows_recon,
        float **pr_mat, float *rr,
        float k_col, float k_row, float kk_col, float kk_row,
        int **range)

{ int i,j ,ir,jr,ir_cen,jr_cen,oldi ;
  float fli, flj, rt[3], rcol[3], rc[3], jpix, mtk[3], rng ;
  int col_max, row_max, col_min, row_min;
  int nrows, ncols; /* returned as necessary array size */
  int corner[4][4];

printf("ncols_ladar = %d, nrows_ladar = %d\n", ncols_ladar,
         nrows_ladar);

printf("Please wait...determining VISIBLE
         mapping corners...\n");

ir_cen = 1024;
  jr_cen = 1024;

/**** For each pixel, ---in small angle approximation ****/
  /*** compute line-of-sight vector in LADAR coordinates ****/

/* map upper left pixel */
  fli = 0;
  flj = 0;
  i = (int) fli;
  j = (int) flj;
  rt[1] = (fli-ncols_ladar/2) * k_col;
  /** transform line-of-sight to recon photo coords **/
  rcol[0] = pr_mat[0][1] * rt[1] + pr_mat[0][2];
  rcol[1] = pr_mat[1][1] * rt[1] + pr_mat[1][2];
  rcol[2] = pr_mat[2][1] * rt[1] + pr_mat[2][2];
  jpix =(float)nrows_ladar/2;
  mtk[0] = pr_mat[0][0]*k_row;
  mtk[1] = pr_mat[1][0]*k_row;
  mtk[2] = pr_mat[2][0]*k_row;

rng = 20 + range[i][j];
  rt[0] = (flj-jpix);
  rc[0] = rr[0] + rng *( mtk[0]*rt[0] + rcol[0] );
  rc[1] = rr[1] + rng *( mtk[1]*rt[0] + rcol[1] );
  rc[2] = rr[2] + rng *( mtk[2]*rt[0] + rcol[2] );
  /** project onto recon plane **/
  corner[0][0] = ir_cen + kk_col * rc[1]/rc[2];
  corner[0][1] = jr_cen + kk_row * rc[0]/rc[2];

/* map upper right pixel */
  fli = 0;
  flj=nrows_ladar-1;
  i = (int) fli;
  j = (int) flj;
  rt[1] = (fli-ncols_ladar/2) * k_col;
  /** transform line-of-sight to recon photo coords **/
  rcol[0] = pr_mat[0][1] * rt[1] + pr_mat[0][2];
  rcol[1] = pr_mat[1][1] * rt[1] + pr_mat[1][2];
  rcol[2] = pr_mat[2][1] * rt[1] + pr_mat[2][2];
  jpix =(float)nrows_ladar/2;
  mtk[0] = pr_mat[0][0]*k_row;
  mtk[1] = pr_mat[1][0]*k_row;
  mtk[2] = pr_mat[2][0]*k_row;

rng = 20 + range[i][j];
  rt[0] = (flj-jpix);
  rc[0] = rr[0] + rng *( mtk[0]*rt[0] + rcol[0] );
```

```
rc[1] = rr[1] + rng *( mtk[1]*rt[0] + rcol[1] );
rc[2] = rr[2] + rng *( mtk[2]*rt[0] + rcol[2] );
/****   project onto recon plane ****/
corner[0][2] = ir_cen +  kk_col * rc[1]/rc[2];
corner[0][3] = jr_cen +  kk_row * rc[0]/rc[2];

/* map lower left pixel */
fli = ncols_ladar-1;
flj = 0;
i = (int) fli;
j = (int) flj;
rt[1] = (fli-ncols_ladar/2) * k_col;
/****  transform line-of-sight to recon photo coords ****/
rcol[0] = pr_mat[0][1] * rt[1] + pr_mat[0][2];
rcol[1] = pr_mat[1][1] * rt[1] + pr_mat[1][2];
rcol[2] = pr_mat[2][1] * rt[1] + pr_mat[2][2];
jpix =(float)nrows_ladar/2;
mtk[0] = pr_mat[0][0]*k_row;
mtk[1] = pr_mat[1][0]*k_row;
mtk[2] = pr_mat[2][0]*k_row;

rng = 20 + range[i][j];
rt[0] = (flj-jpix);
rc[0] = rr[0] + rng *( mtk[0]*rt[0] + rcol[0] );
rc[1] = rr[1] + rng *( mtk[1]*rt[0] + rcol[1] );
rc[2] = rr[2] + rng *( mtk[2]*rt[0] + rcol[2] );
/****   project onto recon plane ****/
corner[1][0] = ir_cen +  kk_col * rc[1]/rc[2];
corner[1][1] = jr_cen +  kk_row * rc[0]/rc[2];

/* map lower right pixel */
fli = ncols_ladar-1;
flj = nrows_ladar-1;
i = (int) fli;
j = (int) flj;
rt[1] = (fli-ncols_ladar/2) * k_col;
/****  transform line-of-sight to recon photo coords ****/
rcol[0] = pr_mat[0][1] * rt[1] + pr_mat[0][2];
rcol[1] = pr_mat[1][1] * rt[1] + pr_mat[1][2];
rcol[2] = pr_mat[2][1] * rt[1] + pr_mat[2][2];
jpix =(float)nrows_ladar/2;
mtk[0] = pr_mat[0][0]*k_row;
mtk[1] = pr_mat[1][0]*k_row;
mtk[2] = pr_mat[2][0]*k_row;

rng = 20 + range[i][j];
rt[0] = (flj-jpix);
rc[0] = rr[0] + rng *( mtk[0]*rt[0] + rcol[0] );
rc[1] = rr[1] + rng *( mtk[1]*rt[0] + rcol[1] );
rc[2] = rr[2] + rng *( mtk[2]*rt[0] + rcol[2] );
/****   project onto recon plane ****/
corner[1][2] = ir_cen +  kk_col * rc[1]/rc[2];
corner[1][3] = jr_cen +  kk_row * rc[0]/rc[2];

col_max = -100000;
row_max = -100000;
col_min =  100000;
row_min =  100000;

if (corner[0][0] > col_max) col_max = corner[0][0];
if (corner[0][0] < col_min) col_min = corner[0][0];

if (corner[0][1] > row_max) row_max = corner[0][1];
if (corner[0][1] < row_min) row_min = corner[0][1];

if (corner[0][2] > col_max) col_max = corner[0][2];
if (corner[0][2] < col_min) col_min = corner[0][2];

if (corner[0][3] > row_max) row_max = corner[0][3];
if (corner[0][3] < row_min) row_min = corner[0][3];

if (corner[1][0] > col_max) col_max = corner[1][0];
if (corner[1][0] < col_min) col_min = corner[1][0];

if (corner[1][1] > row_max) row_max = corner[1][1];
if (corner[1][1] < row_min) row_min = corner[1][1];
if (corner[1][2] > col_max) col_max = corner[1][2];
if (corner[1][2] < col_min) col_min = corner[1][2];
if (corner[1][3] > row_max) row_max = corner[1][3];
if (corner[1][3] < row_min) row_min = corner[1][3];
ncols = col_max - col_min;
```

```
        nrows = row_max - row_min;
        printf("Calculated: ncols_recon = %d,
              nrows_recon = %d\n",ncols, nrows);

return;
} /********* END: subroutine MAP_CORNERS() *****************/
#define ARTIF_COLOR   255
/******************************************************************/
/************** START: Subroutine MAP_ARTIFICIAL_V() ***********/
/******************************************************************/
void  map_artificial_V(int ncols_ladar, int nrows_ladar,
          int ncols_recon, int nrows_recon,
          float **pr_mat, float *rr,
          float k_col, float k_row, float kk_col, float kk_row,
          int art_regions, int range, int **z_buf,
          int **edge, int replength  )
{  int i,j ,ir,jr,ir_cen,jr_cen,ir1,ir2,jr1,jr2;
   int jtemp, jpre, jfil, rc;
   float fli,flj, rt[3],rcol[3], rc1[3],rc2[3], mtk[3], rng;
   int point1_inside, point2_inside;

printf("Please wait...generating ARTIFICIAL regions...\n");

/**** Initialize variables ****/
   ir_cen = ncols_recon/2;   /* center of recon photo */
   jr_cen = nrows_recon/2;

/**** For each pixel, ---in small angle approximation  *******/
   /**** compute line-of-sight vector in SENSOR coordinates ******/
   for (i=2; i<ncols_ladar-2; i++)    /* scan along col starting at col 2 */
   {  rt[1] = (i-ncols_ladar/2) * k_col;
      /****** transform line-of-sight to recon photo coordinates ******/
      rcol[0] = pr_mat[0][1] * rt[1] + pr_mat[0][2];
      rcol[1] = pr_mat[1][1] * rt[1] + pr_mat[1][2];
      rcol[2] = pr_mat[2][1] * rt[1] + pr_mat[2][2];

mtk[0] = pr_mat[0][0]*k_row;
      mtk[1] = pr_mat[1][0]*k_row;
      mtk[2] = pr_mat[2][0]*k_row;

for(j=2; j<nrows_ladar-2; j++)  /*** start line processing ****/
      {  jpre = j-1;                   /* save for next pass*/
         if (edge[i][j]>0)             /* test for edges*/
         {  /* map current pixel*/
            /* correction for sensor dynamics */
            rng = 20 + range[i][j];
            rt[0] = (float)(j-nrows_ladar/2);
            /* mapping x,y,z of first point */
            rc1[0] = rr[0] + rng *( mtk[0]*rt[0] + rcol[0] );
            rc1[1] = rr[1] + rng *( mtk[1]*rt[0] + rcol[1] );
            rc1[2] = rr[2] + rng *( mtk[2]*rt[0] + rcol[2] );

/* map previous pixel*/
            rng = 20 + range[i][jpre];
            rt[0] = (float)(jpre-nrows_ladar/2);
            /* mapping x,y,z of second point */
            rc2[0] = rr[0] + rng *( mtk[0]*rt[0] + rcol[0] );
            rc2[1] = rr[1] + rng *( mtk[1]*rt[0] + rcol[1] );
            rc2[2] = rr[2] + rng *( mtk[2]*rt[0] + rcol[2] );

/****** project onto recon plane ******/
            if( (rc1[2]>0.0) && (rc2[2]>0.0) )
            {  ir1 = ir_cen + kk_col * rc1[1]/rc1[2];
               jr1 = jr_cen + kk_row * rc1[0]/rc1[2];
               ir2 = ir_cen + kk_col * rc2[1]/rc2[2];
               jr2 = jr_cen + kk_row * rc2[0]/rc2[2];

point1_inside= ( (0<ir1) && (ir1<ncols_recon)
                             && (0<jr1) && (jr1<nrows_recon) );
               point2_inside= ( (0<ir2) && (ir2<ncols_recon)
                             && (0<jr2) && (jr2<nrows_recon) );

if (point1_inside && point2_inside)
               { for(jfil=0; jfil<replength; jfil++)
                 { ir = ir1 + ((ir2-ir1)*jfil)/replength;
                   jr = jr1 + ((jr2-jr1)*jfil)/replength;
                   rc = rc1[2] + ((rc2[2]-rc1[2])*jfil)/replength;
                   if ( rc < z_buf[ir][jr] )
                   { art_regions[ir][jr] = ARTIF_COLOR;
                     z_buf[ir][jr] = rc;
                   }
                 }
```

```
                }
            }
            else if (point1_inside && (! point2_inside))
            {  for(jfil=0; jfil<replength; jfil++)
               {  ir = ir1 + ((ir2-ir1)*jfil)/replength;
                  jr = jr1 + ((jr2-jr1)*jfil)/replength;

if ( (0<ir) && (ir<ncols_recon) && (0<jr)
                        && (jr<nrows_recon) )
                  {  rc = rc1[2] + ((rc2[2]-rc1[2])*jfil)/replength;
                     if ( rc < z_buf[ir][jr] )
                     {  art_regions[ir][jr] = ARTIF_COLOR;
                        z_buf[ir][jr] = rc;
                     }
                  }
                  else
                     jfil=replength;
               }
            }
            else if (point2_inside && (! point1_inside))
            {  for(jfil=0; jfil<replength; jfil++)
               {  ir = ir2 + ((ir1-ir2)*jfil)/replength;
                  jr = jr2 + ((jr1-jr2)*jfil)/replength;

if ( (0<ir) && (ir<ncols_recon) && (0<jr)
                        && (jr<nrows_recon) )
                  {  rc = rc2[2] + ((rc1[2]-rc2[2])*jfil)/replength;
                     if ( rc < z_buf[ir][jr] )
                     {  art_regions[ir][jr] = ARTIF_COLOR;
                        z_buf[ir][jr] = rc;
                     }
                  }
                  else
                     jfil=replength;
               }
            }
         }
      }
   }
   return;
} /************* END: subroutine MAP_ARTIFICIAL_V() ******************/

/*****************************************************************/
/************* START: Subroutine MAP_ARTIFICIAL_H() *************/
/*****************************************************************/
void map_artificial_H(int ncols_ladar, int nrows_ladar,
         int ncols_recon, int nrows_recon,
         float **pr_mat, float *rr,
         float k_col, float k_row, float kk_col, float kk_row,
         int art_regions, int range, int **z_buf,
         int **edge, int replength  )
{  int i,j ,ir,jr,ir_cen,jr_cen,ir1,ir2,jr1,jr2;
   int jtemp, ipre, jfil, rc;
   float fli,flj, rt[3],rcol[3], rc1[3],rc2[3], mtk[3], rng;
   int point1_inside, point2_inside;

/**** Initialize variables ****/
   ir_cen = ncols_recon/2;   /* center of recon photo */
   jr_cen = nrows_recon/2;

/**** For each pixel, ---in small angle approximation  ******/
   /**** compute line-of-sight vector in SENSOR coordinates ******/
   mtk[0] = pr_mat[0][0]*k_row;
   mtk[1] = pr_mat[1][0]*k_row;
   mtk[2] = pr_mat[2][0]*k_row;

for (i=2; i<ncols_ladar-2; i++)    /* scan along col starting at col 2 */
   {
      for(j=2; j<nrows_ladar-2; j++)  /*** start line processing ****/
      {  ipre = i-1;                  /* save for next pass*/
         if (edge[i][j] > 0)          /* test for edges*/
         {  rt[1] = (i-ncols_ladar/2) * k_col;
            /***** transform line-of-sight to recon photo coordinates *****/
            rcol[0] = pr_mat[0][1] * rt[1] + pr_mat[0][2];
            rcol[1] = pr_mat[1][1] * rt[1] + pr_mat[1][2];
            rcol[2] = pr_mat[2][1] * rt[1] + pr_mat[2][2];

rng = 20 + range[i][j];
            rt[0] = (float)(j-nrows_ladar/2);
            /* mapping x,y,z of first point */
            rc1[0] = rr[0] + rng *( mtk[0]*rt[0] + rcol[0] );
```

```c
            rc1[1] = rr[1] + rng *( mtk[1]*rt[0] + rcol[1] );
            rc1[2] = rr[2] + rng *( mtk[2]*rt[0] + rcol[2] );

/* map previous pixel*/
            rt[1] = (ipre-ncols_ladar/2) * k_col;
            /***** transform line-of-sight to recon photo coordinates *****/
            rcol[0] = pr_mat[0][1] * rt[1] + pr_mat[0][2];
            rcol[1] = pr_mat[1][1] * rt[1] + pr_mat[1][2];
            rcol[2] = pr_mat[2][1] * rt[1] + pr_mat[2][2];

rng = 20 + range[ipre][j];
            rt[0] = (float)(j-nrows_ladar/2);
            /* mapping x,y,z of second point */
            rc2[0] = rr[0] + rng *( mtk[0]*rt[0] + rcol[0] );
            rc2[1] = rr[1] + rng *( mtk[1]*rt[0] + rcol[1] );
            rc2[2] = rr[2] + rng *( mtk[2]*rt[0] + rcol[2] );

/************* project onto recon plane *********************/
            if( (rc1[2]>0.0) && (rc2[2]>0.0) )
            { /* x,y of points on recon plane */
              ir1 = ir_cen +  kk_col * rc1[1]/rc1[2];
              jr1 = jr_cen +  kk_row * rc1[0]/rc1[2];
              ir2 = ir_cen +  kk_col * rc2[1]/rc2[2];
              jr2 = jr_cen +  kk_row * rc2[0]/rc2[2];

point1_inside= ( (0<ir1) && (ir1<ncols_recon) && (0<jr1)
                            && (jr1<nrows_recon) );
              point2_inside= ( (0<ir2) && (ir2<ncols_recon) && (0<jr2)
                            && (jr2<nrows_recon) );

if (point1_inside && point2_inside)
              { for(jfil=0; jfil<replength; jfil++)
                { ir = ir1 + ((ir2-ir1)*jfil)/replength;
                  jr = jr1 + ((jr2-jr1)*jfil)/replength;
                  rc = rc1[2] + ((rc2[2]-rc1[2])*jfil)/replength;
                  if ( rc < z_buf[ir][jr] )
                  { art_regions[ir][jr] = ARTIF_COLOR;
                    z_buf[ir][jr] = rc;
                  }
                }
              }
              else if (point1_inside && (! point2_inside))
              { for(jfil=0; jfil<replength; jfil++)
                { ir = ir1 + ((ir2-ir1)*jfil)/replength;
                  jr = jr1 + ((jr2-jr1)*jfil)/replength;

if ( (0<ir) && (ir<ncols_recon) && (0<jr)
                      && (jr<nrows_recon) )
                  { rc = rc1[2] + ((rc2[2]-rc1[2])*jfil)/replength;
                    if ( rc < z_buf[ir][jr] )
                    { art_regions[ir][jr] = ARTIF_COLOR;
                      z_buf[ir][jr] = rc;
                    }
                  }
                  else
                      jfil=replength;
                }
              }
              else if (point2_inside && (! point1_inside))
              { for(jfil=0; jfil<replength; jfil++)
                { ir = ir2 + ((ir1-ir2)*jfil)/replength;
                  jr = jr2 + ((jr1-jr2)*jfil)/replength;

if ( (0<ir) && (ir<ncols_recon) && (0<jr)
                      && (jr<nrows_recon) )
                  { rc = rc2[2] + ((rc1[2]-rc2[2])*jfil)/replength;
                    if ( rc < z_buf[ir][jr] )
                    { art_regions[ir][jr] = ARTIF_COLOR;
                      z_buf[ir][jr] = rc;
                    }
                  }
                  else
                      jfil=replength;
                }
              }
            }
          }
        }
      }
    } return;
} /************ END: subroutine MAP_ARTIFICIAL_H() ****************/
```

```
c      Program to correct for LADAR dynamics.

implicit none include 'ipes$include:ipunits.inc'
       include 'ipes$include:ipflag_values.inc'
       include 'ipes$include:ipcontrol.inc' character*80 fname
       integer*4 rslot,islot,azslot,elslot,yawslot,pitslot,rollslot,rw_hdr
       integer*4 xslot,yslot,zslot,nr,nc,i,j,nf,status
       integer*2 az(340,148),el(340,148),pitch(340,148),roll(340,148),yaw(340,148)

include 'lash$include:lash_hdr.inc' do j=1,148
       do i=1,340
       az(i,j)=i-170
       el(i,j)=j-72
       pitch(i,j)=0
       roll(i,j)=0
       yaw(i,j)=0
       end do
       end do call ipinit write(6,'('' Enter filename to process'')')
       read(5,'(q,a80)',err=1,end=1),nf,fname(1:nf)
c
c      Read header for the file
c
       status=rw_hdr('lash$header:'//fname(1:nf)//'.hdr',hdr,0)

call ipinput ('lash$data:'//fname(1:nf),rslot,,)
       call iplist_ctl (rslot,'input and display',ipprompt)

c      call ipinput ('lash$data:'//fname(1:nf)//'az',azslot,,)
c      call iplist_ctl (azslot,'input and display',ipprompt)

c      call ipinput ('lash$data:'//fname(1:nf)//'el',elslot,,)
c      call iplist_ctl (elslot,'input and display',ipprompt)

c      call ipinput ('lash$data:'//fname(1:nf)//'yaw',yawslot,,)
c      call iplist_ctl (yawslot,'input and display',ipprompt)

c      call ipinput ('lash$data:'//fname(1:nf)//'pitch',pitslot,,)
c      call iplist_ctl (pitslot,'input and display',ipprompt)

c      call ipinput ('lash$data:'//fname(1:nf)//'roll',rollslot,,)
c      call iplist_ctl (rollslot,'input and display',ipprompt)

nr=ipslots(rslot).nrows
       nc=ipslots(rslot).ncols call ipoutput('lash$output:'//fname(1:nf)//'x',iptype_rs4,nr,nc,xslot,)
       call ipoutput('lash$output:'//fname(1:nf)//'y',iptype_rs4,nr,nc,yslot,)
       call ipoutput('lash$output:'//fname(1:nf)//'z',iptype_rs4,nr,nc,zslot,)

c      hdr.info.lpr=laser pulse rate (18.8 khz)
c      hdr.info.clks=laser clocks per nod (188)
c      hdr.info.gsf=gimbal scale factor conversion
```

What is claimed is:

1. A computer executed method for generating a signal encoding a three-dimensional representation of a target scene from a selected perspective, comprising the steps of:

(a) transmitting a laser light signal toward said target scene, said target scene reflecting at least a portion of said transmitted laser light signal, said reflected portion referred to as a reflected laser light signal;

(b) receiving, with light detecting optics, the reflected laser light signal;

(c) converting said reflected laser light signal into a first row-column array, wherein said row-column array includes multiple data elements addressable by first row and column addresses, and data element corresponds to a point in the target scene and includes a range value indicative of the distance between the optical detector and the point represented by that data element;

(d) determining a first spherical coordinate of each data element of the first row-column array;

(e) converting the first spherical coordinate of each data element to a first three-dimensional Cartesian coordinate of each data element, wherein said first Cartesian coordinate of each data element is associated with an initial perspective corresponding to an initial orientation of the light detecting optics with respect to the target scene;

(f) converting the first three-dimensional Cartesian coordinate of each data element to a second three-dimensional Cartesian coordinate of each data element, wherein said second three-dimensional Cartesian coordinate of each data element is associated with the selected perspective, said selected perspective being different than the initial perspective;

(g) converting the second three-dimensional Cartesian coordinate of each data element to a second spherical coordinate of each data element; and (h) generating the signal encoding the three-dimensional representation of the target scene from the selected perspective, said signal generated by converting the second spherical coordinate of each data element to a second row and column address for each data element.

2. The method of claim 1, further comprising step of storing the range value of each data element in a second row-column array according to the second row and column addresses.

3. The method of claim 2, further comprising the step of visually representing the signal encoding the three-dimensional representation of the target scene from the selected perspective on a graphics monitor.

4. The method of claim 1, wherein each data element additionally includes an intensity value representative of the intensity of the reflected laser light signal reflected by a point in the target scene represented by that data element.

5. The method of claim 1, further comprising the step of visually representing the data elements on a graphics monitor.

6. The method of claim 2, wherein the second row-column array has a maximum row address and a maximum column address.

7. The method of claim 6, further comprising the step of executing a boundary check on the second row-column array to prevent storage of data elements having a second row address or a second column address greater than the maximum row address or the maximum column address, respectively.

8. The method of claim 1, further comprising the step of executing a background plane routine.

9. The method of claim 2 further comprising, in the event a previously hidden surface has been exposed, the steps of:

(1) generating a first background plane by performing a first regression analysis on the data elements of the first row-column array;

(2) generating a second background plane by performing a second regression analysis solely on the data elements of the first row-column array having a range greater than the first background plane;

(3) identifying addresses of the second row-column array having selected contents; and (4) in the identified addresses, storing range values of corresponding points of the second background plane.

10. A computer executed method for generating a signal encoding a three-dimensional representation of a target scene from a selected perspective, comprising the steps of:

(a) transmitting a laser light signal toward the target scene, said target scene reflecting at least a portion of said transmitted laser light signal, said reflected portion being referred to as a reflected laser light signal;

(b) receiving the reflected laser light signal from a first perspective with light detecting optics;

(c) converting the reflected laser light signal to a first row-column array representative of the target scene, wherein said first row-column array includes multiple data elements addressable by first row and column addresses, and each data element corresponds to a particular point in the target scene and includes a range;

(d) converting the first row-column array into a first spherical coordinate array, wherein each data element in the first row-column array has a separate first spherical coordinate;

(e) converting the first spherical coordinate array into a first three-dimensional Cartesian coordinate array having a reference point that corresponds to an initial perspective, wherein each data element in the first spherical coordinate array has a separate first three-dimensional Cartesian coordinate;

(f) converting the first three-dimensional Cartesian coordinate array into a second three-dimensional Cartesian coordinate array having a reference point that corresponds to the selected perspective different than the initial perspective, wherein each data element in the first three-dimensional Cartesian coordinate array has a separate second three-dimensional Cartesian coordinate;

(g) converting the second three-dimensional Cartesian coordinate array into a second spherical coordinate array, wherein each data element in the second three-dimensional Cartesian coordinate array has a separate second spherical coordinate; and (h) generating the signal encoding a three-dimensional representation of the target scene from the selected perspective, said signal generated by converting the second spherical coordinate array into a second row-column array, wherein each data element in the second row-column array is addressable by second row and column addresses.

11. The method of claim 10, further comprising the step of visually representing the signal encoding the three-dimensional representation of the target scene from the selected perspective array on a graphics monitor.

12. The method of claim 10, wherein each data element additionally includes an intensity value representative of the reflected laser light signal reflected by a point in the target scene represented by the data element.

13. The method of claim 10, wherein the second row-column array has a maximum row address and a maximum column address.

14. The method of claim 13, further comprising the step of performing a boundary check on the second row-column array to prevent storage of data elements having a second row address or a second column address greater than the maximum row address or the maximum column address, respectively.

15. The method of claim 10, further comprising the step of executing a background plane routine.

16. The method of claim 10, further comprising, in the event a previously hidden surface has been exposed, the steps of:

(a) generating a first background plane by performing a first regression analysis on the data elements of the first row-column array;

(b) generating a second background plane by performing a second regression analysis solely on all data elements of the first row-column array whose range is greater than the first background plane;

(c) identifying addresses of the second row-column array having no data stored therein; and (d) in the identified addresses of the second row-column array, storing range values of corresponding points of the second background plane.

17. A computer executed method for generating a three-dimensional representation of a target scene from a selected perspective, comprising the steps of:

(a) transmitting a laser light signal toward the target scene, said target scene reflecting at least a portion of the transmitted laser light signal, said reflected portion referred to as a reflected laser light signal;

(b) receiving, with light detecting optics, the reflected laser light signal;

(c) converting the reflected laser light signal to a first spherical-coordinate array representative of the target scene, wherein said first spherical-coordinate array includes multiple data elements addressable by first and second angles, and each data element corresponds to a point in the target scene and includes a range value indicative of the distance between the light detecting optics and the point in the target scene represented by the data element;

(d) generating a first three-dimensional Cartesian coordinate array by converting the first angle, the second angle, and the range of each data element in the first spherical coordinate array to a first three-dimensional Cartesian coordinate data element, said first three-dimensional Cartesian coordinate array having an initial perspective corresponding to the location of the light detecting optics with respect to the target scene;

(e) generating a second three-dimensional Cartesian coordinate array by converting the coordinate for each data element in the first three-dimensional Cartesian coordinate array to a second three-dimensional Cartesian coordinate having the selected perspective, said selected perspective being different than the initial perspective; and (f) generating the signal encoding the three-dimensional representation of the target scene from the selected perspective by converting each data element in the second three-dimensional Cartesian coordinate array to a second spherical coordinate data element.

* * * * *

UNITED STATES PATENT AND TRADEMARK OFFICE
CERTIFICATE OF CORRECTION

PATENT NO. : 5,430,806
DATED : July 4, 1995
INVENTOR(S) : James L. Nettles

It is certified that error appears in the above-indentified patent and that said Letters Patent is hereby corrected as shown below:

Column 33, line 11, insert the word --the-- between the words "comprising" and "step".

Column 33, line 31, delete the word "executing" and substitute therefor the word --performing--.

Column 34, line 38, delete the word "array".

Signed and Sealed this

Nineteenth Day of September, 1995

Attest:

BRUCE LEHMAN

Attesting Officer

Commissioner of Patents and Trademarks